(12) United States Patent
Isobe

(10) Patent No.: US 8,917,223 B2
(45) Date of Patent: Dec. 23, 2014

(54) ILLUMINATION UNIT AND DISPLAY APPARATUS

(75) Inventor: Hiroshi Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 13/367,919

(22) Filed: Feb. 7, 2012

(65) Prior Publication Data
US 2012/0229522 A1 Sep. 13, 2012

(30) Foreign Application Priority Data

Mar. 11, 2011 (JP) ................................ 2011-053988

(51) Int. Cl.
| | | |
|---|---|---|
| *G09G 3/00* | (2006.01) | |
| *H04N 9/31* | (2006.01) | |
| *G09G 3/02* | (2006.01) | |
| *G03B 21/20* | (2006.01) | |
| *G02B 27/14* | (2006.01) | |
| *G09G 3/20* | (2006.01) | |

(52) U.S. Cl.
CPC ............ *G02B 27/146* (2013.01); *H04N 9/3129* (2013.01); *G09G 2330/06* (2013.01); *G09G 3/025* (2013.01); *G03B 21/208* (2013.01); *G09G 3/002* (2013.01); *G09G 3/2011* (2013.01); *G02B 27/141* (2013.01); *G03B 21/2033* (2013.01)
USPC ............. 345/32; 345/102; 345/690; 345/697; 359/227; 359/446

(58) Field of Classification Search
CPC .. G03B 15/05; G03B 21/2033; G03B 21/208; G03B 23/042; G02B 27/141; G02B 27/146; G09G 2330/06; G09G 3/002; G09G 3/025; G09G 3/2011; H04N 9/3129

USPC ............... 345/48, 77, 102, 112, 151, 690, 32, 345/207, 697, 84–87
See application file for complete search history.

(56) References Cited

U.S. PATENT DOCUMENTS

| 6,570,103 B1 * | 5/2003 | Saka et al. ................. 178/18.01 |
|---|---|---|
| 7,116,017 B2 | 10/2006 | Ji et al. |
| 7,277,220 B2 * | 10/2007 | Ohtsuki et al. ............... 359/328 |

(Continued)

FOREIGN PATENT DOCUMENTS

| JP | 2005-010772 A | 1/2005 |
|---|---|---|
| JP | 2005-250473 | 9/2005 |

(Continued)

OTHER PUBLICATIONS

Japanese Patent Office Action issued in connection with related Japanese Patent Application No. 2011-053988 dated Oct. 29, 2014.

*Primary Examiner* — Amare Mengistu
*Assistant Examiner* — Gloryvid Figueroa-Gibson
(74) *Attorney, Agent, or Firm* — Dentons US LLP

(57) ABSTRACT

There are provided an illumination unit and a display apparatus which are capable of improving convenience for users. The illumination unit includes a light source section including a laser light source, an optical device allowing a laser beam from the laser light source to pass therethrough, a drive section allowing the optical device to oscillate, and a control section performing one or both of control of decreasing brightness of emitted light from the light source section and control of outputting to the outside information that oscillation of the optical device has been stopped when the oscillation of the optical device has been stopped during drive operation by the drive section.

11 Claims, 8 Drawing Sheets

(56) References Cited

U.S. PATENT DOCUMENTS

2003/0179797 A1* 9/2003 Egawa et al. .................. 372/58
2008/0158137 A1* 7/2008 Yoshida ........................ 345/102
2010/0027574 A1* 2/2010 Fujita et al. ................ 372/38.02
2010/0097698 A1* 4/2010 Kinoshita et al. ............. 359/446
2011/0018906 A1* 1/2011 Chiu ............................ 345/690

FOREIGN PATENT DOCUMENTS

| JP | 2008-256822 A | 10/2008 |
| JP | 2009-003091 A | 1/2009 |
| JP | 2009-244632 A | 10/2009 |
| WO | 2010/116727 A | 10/2010 |

* cited by examiner

ILLUMINATION UNIT AND DISPLAY APPARATUS

BACKGROUND

This disclosure relates to an illumination unit emitting illumination light including a laser beam, and a display apparatus performing picture display using such illumination light.

Optical modules, which are one of the main components of projectors (projection type display apparatus), typically include an illumination optics (illumination unit) including a light source, and a projection optics including a light modulation device. In recent years, small-size (palm-size) and lightweight portable projectors which are called micro projectors are becoming widely used in the field of projectors. In the past, in the micro projector, Light Emitting Diode (LED) has been mainly used as a light source of an illumination unit.

On the other hand, nowadays, a laser is drawing attention as a new light source of the illumination unit. For example, as a projector using laser beams of three primary colors of red (R), green (G), and blue (B), a projector using a gas laser has been known. The projector using a laser as a light source is proposed in, for example, Japanese Unexamined Patent Application Publication No. 2005-250473. When a laser is used as a light source, a projector which provides wide range of color reproduction and small power consumption is allowed to be achieved.

SUMMARY

Incidentally, when coherent light such as a laser beam is irradiated on a diffusing surface, a spotted pattern which does not appear in the case of normal light is observed. Such a spotted pattern is called a speckle pattern. The speckle pattern is generated due to interference of light diffused by points on the diffusing surface in a random phase relationship corresponding to a microscopic irregularity on the surface.

The above-described projector using a laser as a light source superimposes the speckle pattern (interference pattern) onto a display image on a screen. Therefore, the speckle pattern is perceived by human eyes as strong random noise, and thus the display quality is deteriorated.

As a method of reducing the occurrence of the speckle pattern (speckle noise) in a projector using a laser as a light source, a method in which a predetermined optical device allowing a laser beam to pass therethrough in the projector or a screen is minutely oscillated is proposed. Generally, the human eye and brain cannot discriminate a flicker of an image in the range from approximately 20 to 50 ms. In other words, images within that time range are integrated and averaged in the human eye. Therefore, in this method, a large number of independent speckle patterns are superimposed on the screen within that time range so that the speckle noise is averaged to the extent that the speckle noise is not annoying in the human eye. With use of the method, the occurrence of the interference pattern due to the laser beam is allowed to be reduced.

However, when the oscillation of the optical device has been stopped due to any factor, the reduction function of the interference pattern by the above-described principle is not effective. In such a case, the interference pattern is ultimately generated, and thus the display quality is deteriorated. In other words, since it is difficult to reduce interference pattern according to the operation state of the apparatus (projector), convenience for users is lowered.

It is desirable to provide an illumination unit and a display apparatus which are capable of improving convenience for users.

An illumination unit according to an embodiment of the technology includes a light source section including a laser light source, an optical device allowing a laser beam from the laser light source to pass therethrough, a drive section allowing the optical device to oscillate, and a control section performing one or both of control of decreasing brightness of emitted light from the light source section and control of outputting to the outside information that oscillation of the optical device has been stopped when the oscillation of the optical device has been stopped during drive operation by the drive section.

A display apparatus according to an embodiment of the technology includes the above-described illumination unit according to the embodiment of the technology which emits illumination light, and a light modulation device modulating the illumination light based on a picture signal.

In the illumination unit and the display apparatus according to the embodiments of the technology, the optical device which allows the laser beam from the laser light source to pass therethrough oscillates to reduce occurrence of an interference pattern due to the laser beam. In addition, when the oscillation of the optical device has been stopped during the drive operation by the drive section, one or both of the control of decreasing the brightness of the emitted light from the light source section and the control of outputting to the outside information that the oscillation has been stopped are performed. Therefore, even if the oscillation of the optical device has been stopped due to any factor, the interference pattern that occurs due to the oscillation stop is allowed to be hardly viewed, and the information that the oscillation has been stopped is allowed to be provided to the user. In other words, the reduction of the interference pattern according to the operation state of the apparatus is allowed to be achieved.

The illumination unit and the display apparatus according to the embodiments of the technology perform one or both of the control of decreasing the brightness of the emitted light from the light source section and the control of outputting to the outside information that the oscillation of the optical device has been stopped when the oscillation of the optical device has been stopped during the drive operation by the drive section. Therefore, reduction of the interference pattern according to the operation state of the apparatus is allowed to be achieved, and convenience for users is allowed to be improved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, a preferred embodiment of the technology will be described in detail with reference to drawings. Note that description will be given in the following order.
1. Embodiment (an example of control depending on magnitude of a voltage detected by a resistive element)
2. Modification

Embodiment

[Schematic Configuration of Display Apparatus 1]

Figure 1:
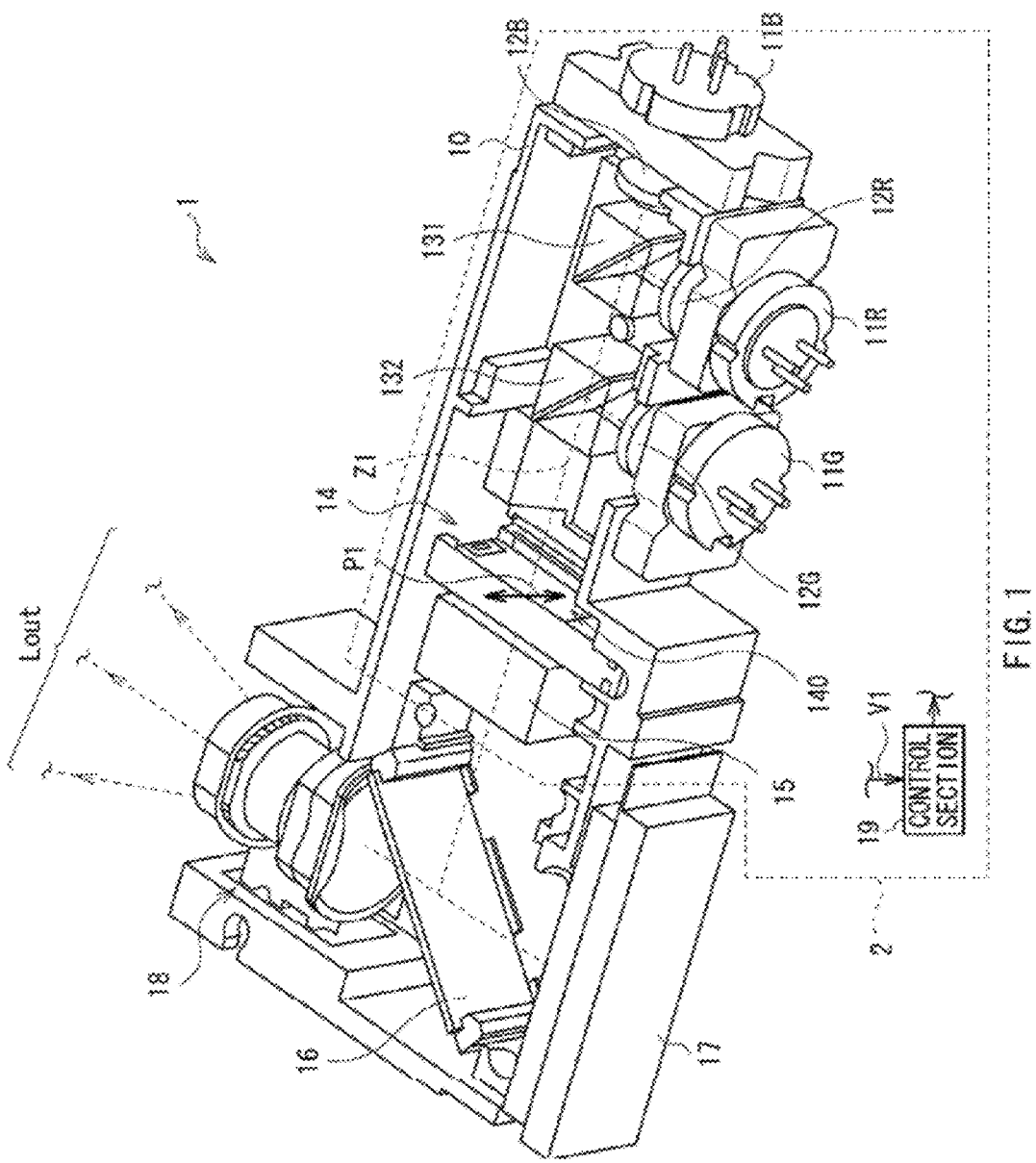
FIG. 1 is a diagram illustrating a schematic configuration of a display apparatus according to an embodiment of the technology.

FIG. 1 is a perspective view illustrating a schematic configuration (sectional configuration) of a display apparatus (display apparatus 1) according to an embodiment of the technology. The display apparatus 1 is a projection type display apparatus projecting a picture (picture light) to a not-illustrated screen (surface to be projected). The display apparatus 1 includes, in a housing 10, a red laser 11R, a green laser 11G, a blue laser 11B, collimator lenses 12R, 12G, and 12B, dichroic prisms 131 and 132, an optical unit 14, and a fly-eye lens 15. The display apparatus 1 further includes a polarization beam splitter (PBS) 16, a reflection-type liquid crystal device 17, a projection lens 18 (projection optics), and a control section 19. Of these, the red laser 11R, the green laser 11G, the blue laser 11B, the collimator lenses 12R, 12G, and 12B, the dichroic prisms 131 and 132, the optical unit 14, the fly-eye lens 15, and the control section 19 configure an illumination unit (illumination unit 2) according to the embodiment of the technology. Note that Z1 illustrated in the figure indicates an optical axis.

The red laser 11R, the green laser 11G, and the blue laser 11B are three kinds of light sources emitting a red laser beam, a green laser beam, and a blue laser beam, respectively. These laser sources configure a light source section, and in this case, the three kinds of light sources serve as laser light sources. The red laser 11R, the green laser 11G, and the blue laser 11B are each configured of, for example, a semiconductor laser or a solid-state laser.

The collimator lenses 12R, 12G, and 12B are lenses collimating the red laser beam emitted from the red laser 11R, the green laser beam emitted from the green laser 11G, and the blue laser beam emitted from the blue laser 11B into respective parallel beams.

The dichroic prism 131 is a prism selectively allowing the blue laser beam which has been collimated by the collimator lens 12B into the parallel beam to pass therethrough, and selectively allowing the red laser beam which has been collimated by the collimator lens 12R into the parallel beam to be reflected. The dichroic prism 132 is a prism selectively allowing the blue laser beam and the red laser beam emitted from the dichroic prism 131 to pass therethrough, and selectively allowing the green laser beam which has been collimated by the collimator lens 12G into the parallel beam to be reflected. Accordingly, color composition (light path composition) with respect to the red laser beam, the green laser beam, and the blue laser beam is performed.

Figure 2:
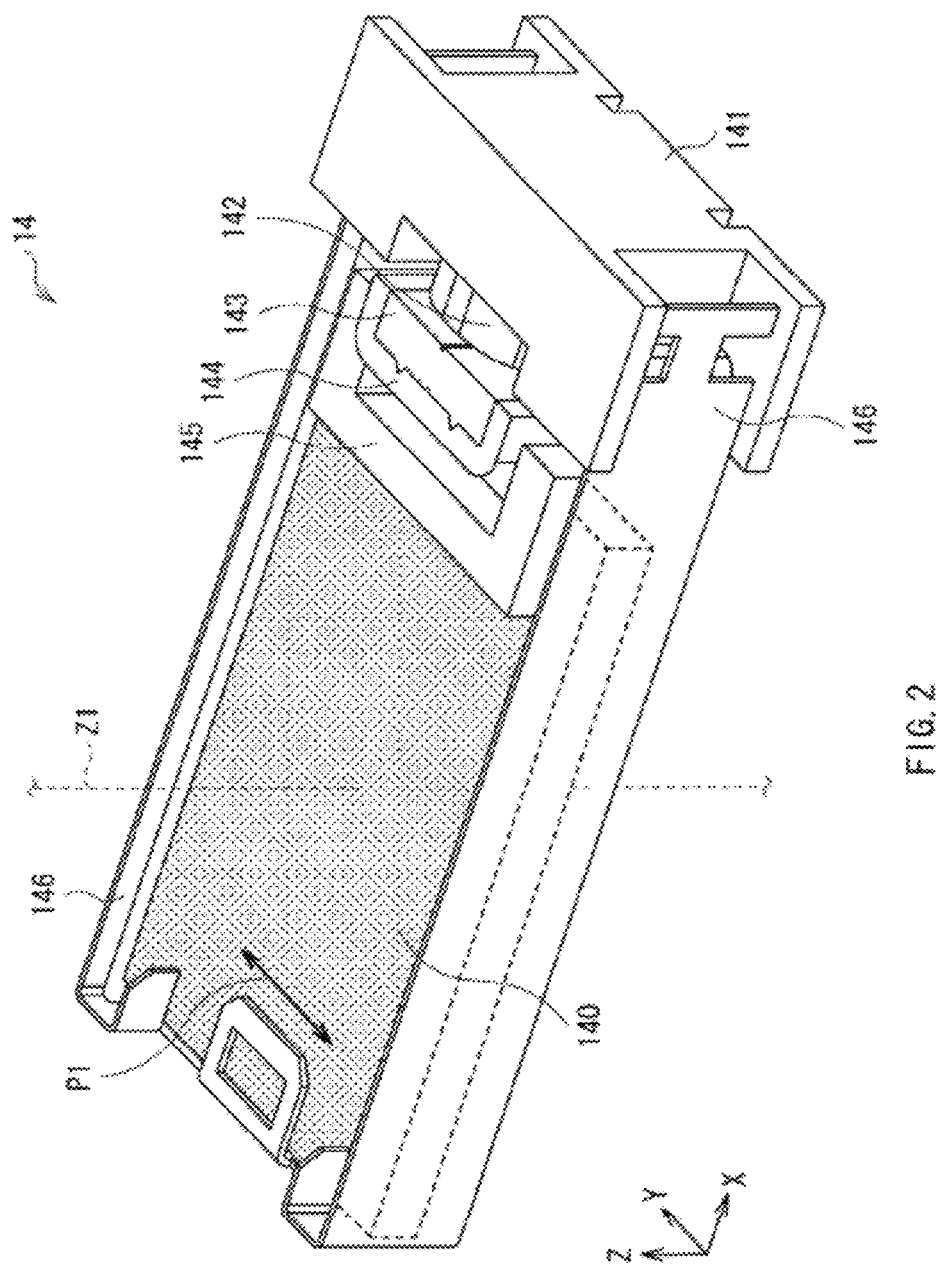
FIG. 2 is a perspective view illustrating a detailed configuration of an optical unit illustrated in FIG. 1.

The optical unit 14 is disposed between the above-described light source section (the red laser 11R, the green laser 11G, and the blue laser 11B) and the reflection-type liquid crystal device 17 (herein, on the light path between the dichroic prism 132 and the fly-eye lens 15). The optical unit 14 includes an optical device (optical device 140) for suppressing speckle noise (interference pattern) described later. Note that the detailed configuration of the optical unit 14 will be described later (FIG. 2).

The fly-eye lens 15 is configured by two-dimensionally arranging a plurality of lenses on a substrate, and spatially splits incident light flux to be emitted, based on the arrangement of the lenses. Accordingly, the light emitted from the fly-eye lens 15 is equalized (an intensity distribution in a plane is equalized), and is then emitted as illumination light from the illumination unit 2.

The polarization beam splitter 16 is an optical member selectively allowing specific polarization light (for example, p-polarization light) to pass therethrough, and selectively allowing another polarization light (for example, s-polarization light) to be reflected. Accordingly, the illumination light (for example, s-polarization light) emitted from the fly-eye lens 15 is selectively reflected and then enters the reflection-type liquid crystal device 17, and picture light (for example, p-polarization light) emitted from the reflection-type liquid crystal device 17 selectively pass through the polarization beam splitter 16 and then enters the projection lens 18.

The reflection-type liquid crystal device 17 is a light modulation device which allows the light (the illumination light from the illumination unit 2) from the light source section (the red laser 11R, the green laser 11G, and the blue laser 11B) to be modulated and reflected based on a picture signal supplied from a not-illustrated display control section, and then emits picture light. At this time, in the reflection-type liquid crystal device 17, reflection is performed so that polarization light (for example, s-polarization light or p-polarization light) at the time of incidence and polarization light (for example, s-polarization light or p-polarization light) at the time of emission are different from each other. Such a reflection-type liquid crystal device 17 is configured of a liquid crystal device such as liquid crystal on silicon (LCOS).

The projection lens 18 is a lens for projecting (magnifying and projecting) light (picture light) modulated by the reflection-type liquid crystal device 17 onto a not-illustrated screen. Accordingly, projection light Lout is projected onto the screen.

The control section 19 performs a predetermined countermeasure control (described later) when oscillation of the optical device 140 described later (optical device for preventing occurrence of an interference pattern) in the optical unit 14 has been stopped during drive operation by the drive section with respect to the optical device 140. Specifically, according to magnitude of a predetermined voltage (detected voltage V1) described later, the control section 19 performs such countermeasure control. Such a control section 19 is configured by a microcomputer and the like. Note that the detail of the control section 19 will be described later.

[Detailed Configuration of Optical Unit 14]

Next, the detailed configuration of the above-described optical unit 14 will be described with referring to FIG. 2. FIG. 2 is a perspective view illustrating a detailed configuration example of the optical unit 14. The optical unit 14 includes the optical device 140, a securing section holder 141, a coil 142, a magnet 143, a yoke 144, a movable section holder 145, and flat springs 146 (holding member). Of these, the coil 142 and the securing section holder 141 configure "a securing section", and the optical device 140, the magnet 143, the yoke 144, and the flat springs 146 configure "a movable section".

The optical device 140 is a device for suppressing the speckle noise as described above, and allows a laser beam traveling on the optical axis Z1 illustrated in the figure to pass therethrough. The optical device 140 is configured of, for example, a prism array, a diffractive device, or a lens, and has a rectangular shape in this case.

The securing section holder 141 is a holder holding the coil 142 as the above-described securing section, and is formed of a material including polycarbonate, liquid crystal polymer, and the like.

The coil 142 is configured of, for example, a winding coil. The magnet 143 is a permanent magnet made of a material such as neodymium (Nd), iron (Fe), and boron (B). The coil 142 and the magnet 143 allow the optical device 140 to oscillate (to perform micro-oscillation) in a predetermined direction (one direction, two directions, rotation direction, and the like) in a plane orthogonal to the light path of the laser beam (corresponding to the optical axis Z1 in the figure) or along the light path (the optical axis Z1), by using electromagnetic force. Specifically, in this case, the coil 142 and the magnet 143 allow the optical device 140 to oscillate along a predetermined one direction (oscillation direction P1 in the figure or Y-axis direction) in the plane orthogonal to the optical axis Z1. Note that the oscillation amount (amplitude) of the micro oscillation is, for example, approximately ±0.5 mm.

The yoke 144 is a member for controlling a direction of magnetic flux output from the magnet 143, and is formed of a material with high magnetic permeability such as iron (Fe). In addition, the yoke 144 is arranged around the magnet 143 to prevent the magnetic flux from the magnet 143 from being output to the outside of the unit (outside of the optical unit 14). Specifically, the yoke 144 is arranged to surround a surface facing the surface on the coil 142 side of the rectangular magnet 143 (surface on the optical device 140 side, Y-Z surface) and side surfaces thereof (Z-X surface).

The movable section holder 145 is a holder holding the optical device 140, the magnet 143, the yoke 144, and the flat springs 146, which serve as the above-described movable section, and in this case, the movable section holder 145 is disposed between the optical device 140 and the yoke 144. The movable section holder 145 is made of a material such as polycarbonate and liquid crystal polymer.

The flat springs 146 are holding members holding the optical device 140, and are respectively arranged on a pair of facing side surfaces (Z-X surfaces) of the rectangular optical device 140. The flat spring 146 is an elastic member, and is formed of a spring material such as SUS301-CSP. In addition, the flat spring 146 is desirably subjected to surface treatment (for example, black coating, matting, or blast treatment (such as sandblast)) for suppressing optical reflectance. Specifically, the surface of the flat spring 146 is desirably black in color, and is desirably subjected to surface treatment so that reflectance with respect to light within a wavelength band of 400 to 700 nm is equal to or smaller than 10%. This is because the deterioration in display quality caused by diffused reflection on the surface is allowed to be prevented when the flat spring 146 is made of a metal.

[Configuration of Main Part of Drive Section for Optical Device 140]

Figure 3:
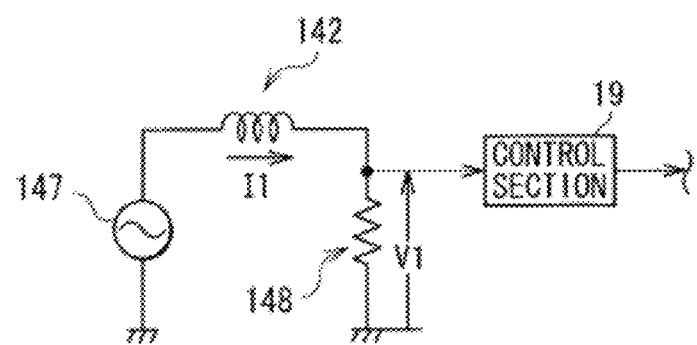
FIG. 3 is a circuit diagram illustrating, together with a control section, a configuration example of a main part of a drive section for an optical device.

Next, the configuration of the main part of the drive section for the above-described optical device 140 will be described with referring to FIG. 3. FIG. 3 is a circuit diagram illustrating, together with the above-described control section 19, a configuration example of the main part of the drive section for the optical device 140. The drive section for the optical device 140 includes a signal generator 147 and a resistive element 148 illustrated in FIG. 3, for example, in addition to the above-described coil 142, the above-described magnet 143, and the like. Herein, one end of the signal generator 147 is connected to one end of the coil 142, and the other end of the signal generator 147 is grounded (is connected to the ground). The other end of the coil 142 is connected to one end of the resistive element 148, and the other end of the resistive element 148 is grounded.

The signal generator 147 is a power source generating an AC voltage used for driving (oscillating) the optical device 140. Accordingly, an alternating drive current I1 illustrated in FIG. 3 flows through the coil 142, and as a result, electromagnetic force at the time of driving the optical device 140 is generated.

The resistive element 148 is an element detecting the above-described drive current I1 which flows through the coil 142 as a voltage. Specifically, a potential (voltage) generated between both ends of the resistive element 148 according to the magnitude of the drive current I1 is detected as the detected voltage V1 (=a resistance value of the resistive element 148*the drive current I1). Incidentally, (the data of) the detected voltage V1 detected in this way is received by the control section 19 as illustrated in FIG. 3.

[Function and Effect of Display Apparatus 1]
(1. Display Operation)

In the display apparatus 1, first, illumination light is emitted from the illumination unit 2 as described below. The light (laser beams) emitted from the red laser 11R, the green laser 11G, and the blue laser 11B are collimated by the collimator lenses 12R, 12G, and 12B, respectively, to be parallel beams. Next, the laser beams thus collimated (the red laser beam, the green laser beam, and the blue laser beam) are composed in color (are subjected to light path composition) by the dichroic prisms 131 and 132. The laser beams subjected to the light path composition pass through the optical unit 14, and then enter the fly-eye lens 15. The entering light is equalized (equalized in the intensity distribution in the plane) by the fly-eye lens 15, and then emitted as illumination light.

Subsequently, the light emitted from the fly-eye lens 15 (illumination light from the illumination unit 2) is selectively reflected by the polarization beam splitter 16, and then enters the reflection-type liquid crystal device 17. The reflection-type liquid crystal device 17 allows the entering light to be modulated and reflected based on a picture signal, and then the reflection-type liquid crystal device 17 emits the modulated and reflected light as picture light. Herein, in the reflection-type liquid crystal device 17, since polarization light at the time of incidence and polarization light at the time of emission are different from each other, the picture light emitted from the reflection-type liquid crystal device 17 selectively passes through the polarization beam splitter 16, and then enters the projection lens 18. Then, the entering light (the picture light) is projected (magnified and projected) onto the not-illustrated screen by the projection lens 18.

At this time, the red laser 11R, the green laser 11G, and the blue laser 11B subsequently generate light (pulse) in a time-divisional manner, and then emit respective laser beams (the red laser beam, the green laser beam, and the blue laser beam).

Then, the reflection-type liquid crystal device 17 subsequently modulates a laser beam of the corresponding color in a time-divisional manner, based on a picture signal of each color component (a red component, a green component, and a blue component). As a result, color picture display based on the picture signal is performed by the display apparatus 1.

(2. Operation for Suppressing Interference Pattern)

Next, operation for suppressing interference pattern described later which is one of the features of the technology will be described in detail in comparison to a comparative example.

(2-1. Comparative Example)

Figure 4:
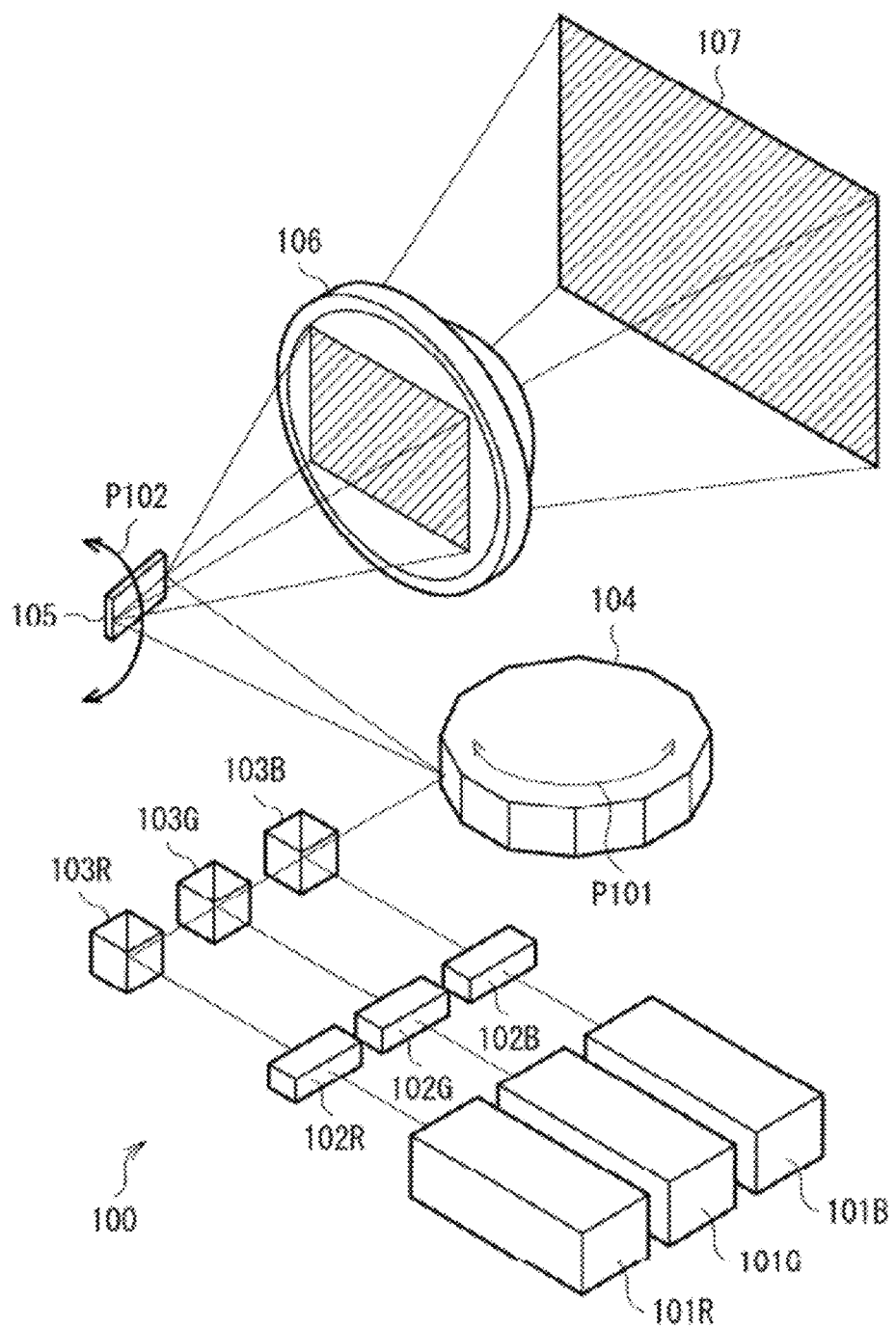
FIG. 4 is a perspective view illustrating a general configuration of a display apparatus according to a comparative example.

FIG. 4 illustrates a general configuration of a display apparatus (display apparatus 100) according to a comparative example. The display apparatus 100 of the comparative example is a projection type display apparatus projecting picture light onto a screen (in this case, a screen 107), similarly to the display apparatus 1 of the embodiment. The display apparatus 100 includes a red laser 101R, a green laser 101G, a blue laser 101B, light intensity modulators 102R, 102G, and 102B, dichroic mirrors 103R, 103G, and 103B, a polygon mirror 104, a galvanometer mirror 105, and an f-θ lens 106.

In the display apparatus 100, a laser beam emitted from the red laser 101R is modulated by the light intensity modulator 102R based on a picture signal and passes through the light intensity modulator 102R, and then is emitted as picture light. Likewise, a laser beam emitted from the green laser 101G is modulated by the light intensity modulator 102G based on the picture signal and passes through the light intensity modulator 102G, and then is emitted as picture light. In addition, a laser beam emitted from the blue laser 101B is modulated by the light intensity modulator 102B based on the picture signal and passes through the light intensity modulator 102B, and then is emitted as picture light. The picture light of each color which has been emitted from the light intensity modulators 102R, 102G, and 102B in such a way is subjected to color composition (light path composition) by the dichroic mirrors 103R, 103G, and 103B, and then enters the polygon mirror 104 as picture light corresponding to a color picture. The entering light is polarized in a horizontal direction by the polygon mirror 104 which rotates at high speed (refer to an arrow P101 in the figure) in synchronization with a horizontal synchronization signal. In addition, the light thus polarized in the horizontal direction is further polarized in a vertical direction by the galvanometer mirror 105 which changes a reflection angle (refer to an arrow P102 in the figure) in synchronization with a vertical synchronization signal. Then, the laser beam polarized in two dimensions is projected (magnified and projected) onto the screen 107 by the f-θ lens 106, and therefore color picture display based on the picture signal is performed by the display apparatus 100.

Figure 5:
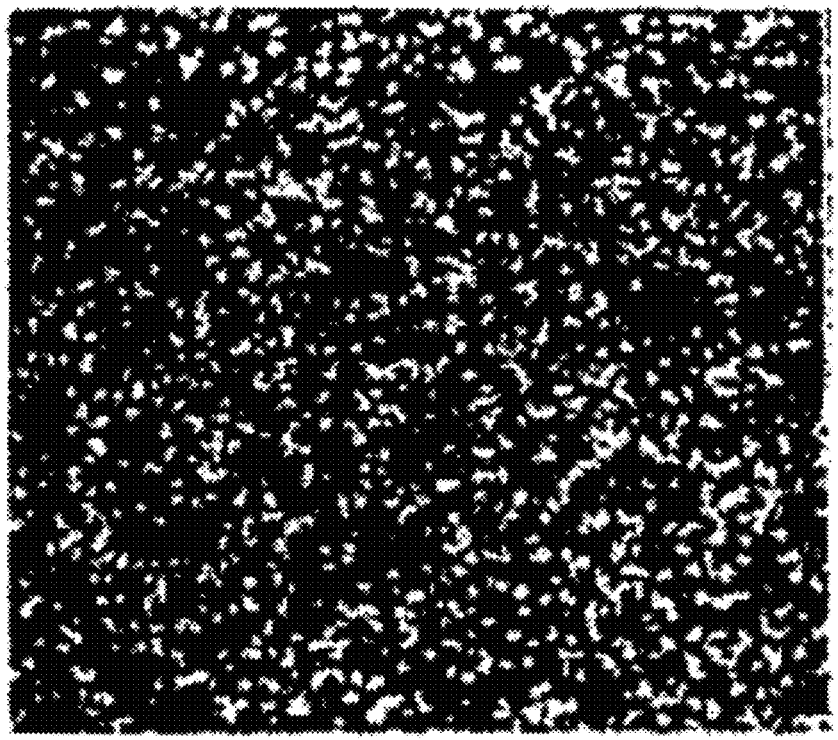
FIG. 5 is a diagram illustrating an example of an interference pattern that occurs on a surface to be projected.

Incidentally, when coherent light such as a laser beam is irradiated on a diffusing surface, a spotted pattern which does not appear in the case of normal light is observed as shown in a photograph of FIG. 5, for example. Such a pattern is called a speckle pattern. The speckle pattern occurs due to interference of light diffused by points on the diffusing surface in a random phase relationship according to microscopic irregularity on the plane. Incidentally, such a speckle pattern is classified broadly into two types. The first type is called a diffraction field speckle which is observed without using an imaging system. The diffraction field speckle is observed when the diffusion light is viewed by a charge coupled device (CCD) camera without lens thereon. In the diffraction field speckle, all irradiated points on the diffusing surface contribute to interference. The second type is called image field speckle which is observed through an imaging system, and corresponds to a speckle observed when the diffusing surface is viewed by eyes.

Herein, a projector using a laser light source as the above-described display apparatus 100 of the comparative example superimposes such a speckle pattern (interference pattern) onto a display image on a screen. Therefore, this is perceived by human eyes as strong random noise, and thus the display quality is deteriorated.

Accordingly, for the projector using a laser light source, a method of allowing a predetermined optical device which allows a laser beam to pass therethrough in the projector or a screen to perform micro-oscillation is considered in order to prevent occurrence of such a speckle pattern (speckle noise). Generally, the human eye and brain cannot discriminate a flicker of the image in a range from about 20 to 50 ms. Specifically, images within the time range are integrated and averaged in the human eye. Therefore, within the time range, a large number of independent speckle patterns are superimposed on the screen so that the speckle noise is averaged to the extent that the speckle noise is not annoying in the human eye.

(2-2. Embodiment)

In the optical unit 14 according to the embodiment, as illustrated in FIGS. 1 and 2, the optical device 140 which allows a laser beam to pass therethrough oscillates (performs micro-oscillation) in the plane (in the X-Y plane, herein, in the oscillation direction P1 along the Y-axis direction) orthogonal to the light path (the optical axis Z1) of the laser beam. Specifically, the optical device 140 is driven so that such oscillation is performed with use of the electromagnetic force by the drive section including the coil 142 and the magnet 143. As a result, the above-described principle prevents occurrence of the speckle noise (interference pattern) caused by the laser beam.

However, in the case where the oscillation of the optical device 140 has been stopped by any factor, the reduction function of the interference pattern by the above-described principle is not effective. In such a case, the interference patterns occur ultimately, thereby deteriorating the display image quality. In other words, since it is difficult to suppress the interference patterns according to the operation state of the display apparatus 1, convenience for users is lowered.

As factors (causes) that the oscillation of the optical device 140 is stopped, there are two factors mainly. The first factor is that disconnection occurs in the drive section (for example, a current path of the drive current I1 illustrated in FIG. 3), and thus the drive current I1 does not flow. The second factor is that a foreign matter (for example, magnetic powder) is present (is caught) in the drive section (for example, in a gap between the coil 142 and the magnet 143 illustrated in FIG. 2), and thus the oscillation of the optical device 140 is mechanically inhibited.

(Relationship between Magnitude of Detected Voltage V1 and Occurrence of Oscillation Stop of Optical Device 140)

In the embodiment, the control section 19 determines occurrence of oscillation stop of the optical device 140 (whether the optical device 140 is normally operated) due to the above-described two factors with use of the value of the voltage (detected voltage V1) between the both ends of the resistive element 148 illustrated in FIG. 3.

Figure 6:
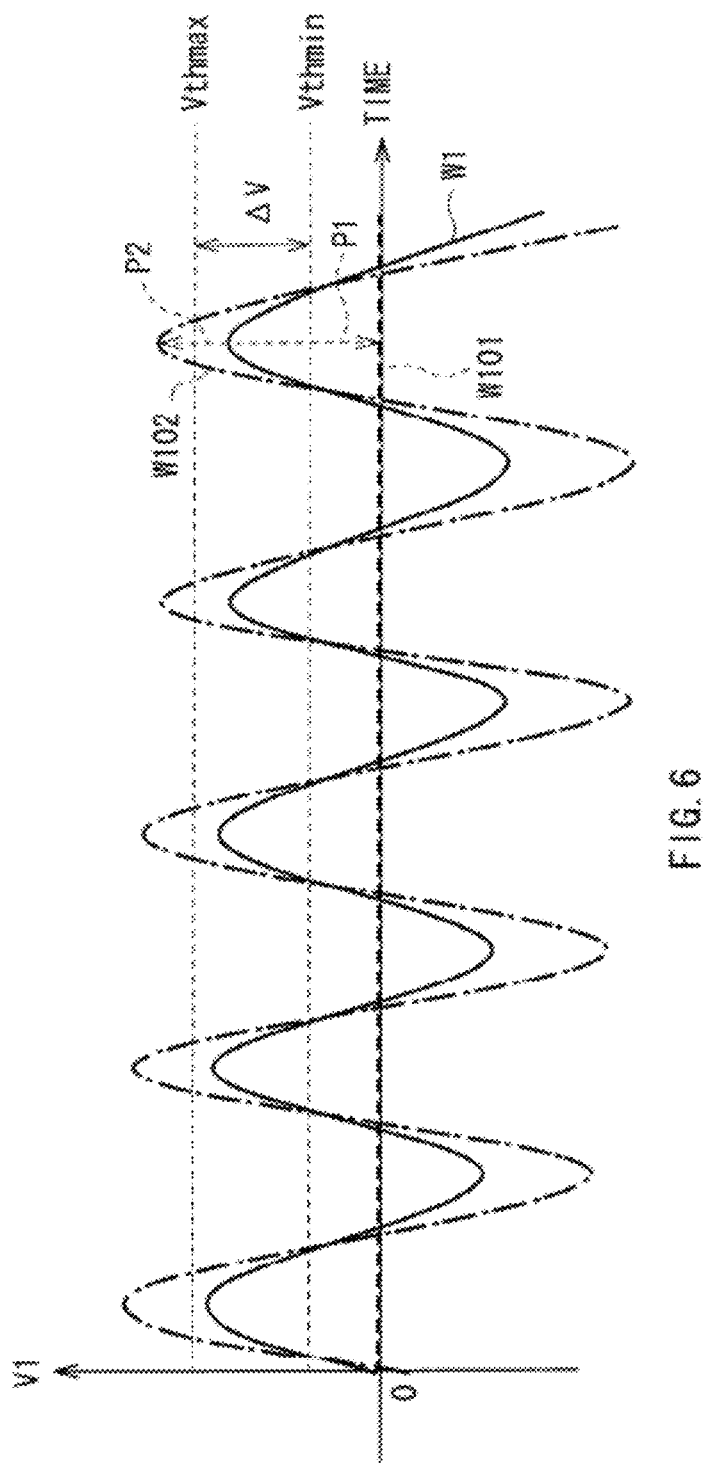
FIG. 6 is a waveform view for describing a relationship between magnitude of a detected voltage and occurrence of oscillation stop of the optical device.

The relationship between the waveform of the detected voltage V1 and the occurrence of the oscillation stop of the optical device 140 will be described with referring to FIG. 6. FIG. 6 illustrates an example of a change in the waveform of the detected voltage V1 with time.

First, when the optical device 140 is normally operated (when the optical device 140 oscillates), the drive current I1 flows through the coil 142, and the detected voltage V1 within a predetermined voltage range ΔV is generated (refer to a voltage waveform W1 in FIG. 6). The voltage range ΔV is, for example, a voltage range securing operation of the display apparatus 1, and is a voltage range from a minimum threshold voltage Vthmin or more to a maximum threshold voltage Vthmax or less.

In contrast, when the optical device 140 is not normally operated due to the above-described first factor (when the optical device 140 does not oscillate), even if the signal generator 147 generates the AC voltage, the drive current I1 does not flow through the coil 142 due to the above-described disconnection. Accordingly, since the value of the drive current I1 is decreased (the drive current I1 does not flow), the value of the detected voltage V1 is smaller (lower) than the voltage range ΔV (the minimum threshold voltage Vthmin), and for example, is invariably 0 V (refer to a voltage waveform W101 in FIG. 6).

On the other hand, when the optical device 140 does not oscillate due to the above-described second factor, since the back electromotive force is not generated by the coil 142 due to the mechanical inhibition of the oscillation by the presence of the foreign matter, the value of the drive current I1 is increased conversely. Therefore, since the value of the drive current I1 is increased, the value of the detected voltage V1 also becomes larger (higher) than the voltage range ΔV (the maximum threshold voltage Vthmax) (refer to a voltage waveform W102 in FIG. 6) conversely. In this case, the following reason contributes to the increase of the value of the drive current I1 when the optical device 140 does not oscillate due to the second factor.

Figure 7:
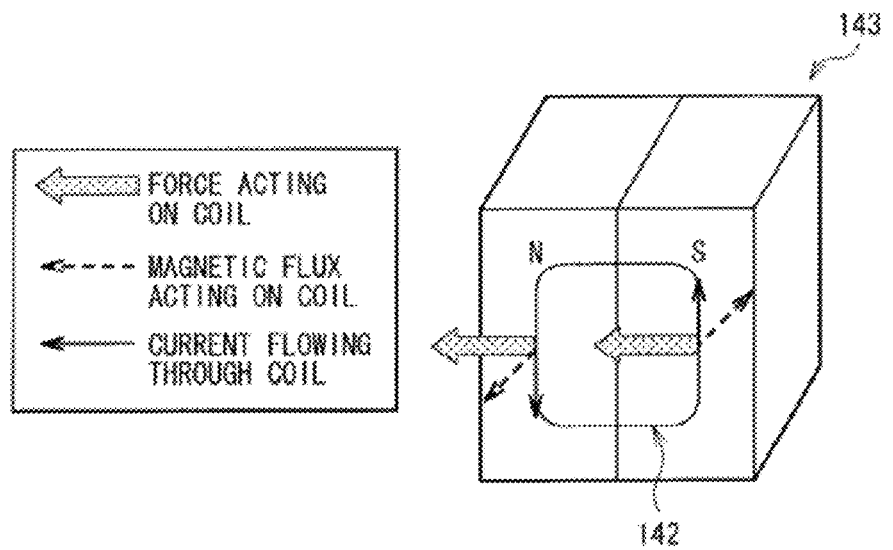
FIG. 7 is a schematic view for describing an outline of Fleming's left-hand rule.

First, as illustrated in FIG. 7, for example, when the current (the drive current I1) flows through the coil 142 and the magnetic flux is generated in a direction orthogonal to the flow direction of the current, force acts on the coil 142 along the direction orthogonal to both directions (Fleming's left-hand rule). With use of the fact that such force acts on the coil 142, the drive section allows the optical device 140 to oscillate.

Figure 8:
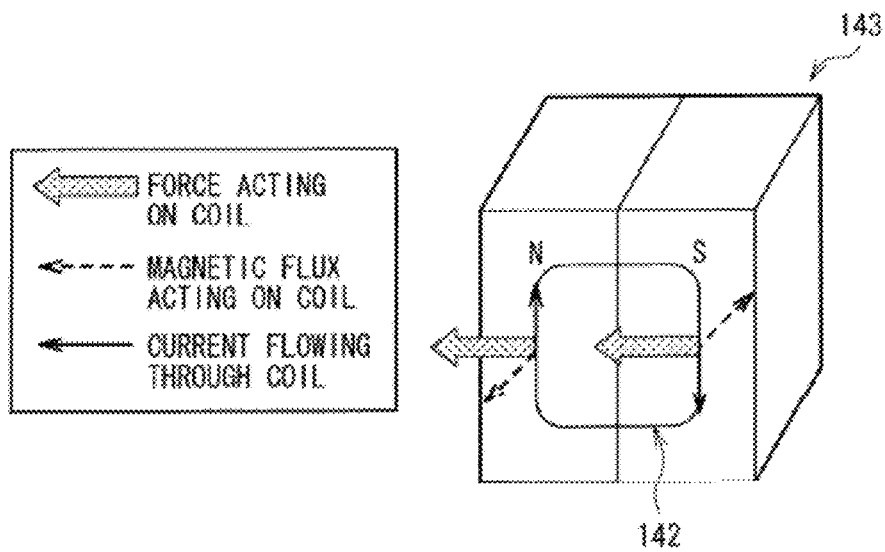
FIG. 8 is a schematic view for describing an outline of Fleming's right-hand rule.

At the same time, as illustrated in FIG. 8, for example, a current in a direction opposite to the direction illustrated in FIG. 7 flows through the coil 142 by the operation (displacement) of the coil 142 (Fleming's right-hand rule). In other words, the current (the drive current I1) flowing through the coil 142 is decreased as a whole due to the back electromotive force generated at this time. However, when the optical device 140 does not oscillate due to the above-described second factor (the mechanical oscillation of the optical device 140 is inhibited by the presence of the foreign matter), the drive current I1 flowing through the coil 142 is conversely increased because the back electromotive force is not generated due to the oscillation stop of the optical device 140.

With use of the above-described relationship between the magnitude of the detected voltage V1 and the occurrence of the oscillation stop of the optical device 140 (and further with use of the fact that which factor causes the oscillation stop), in the embodiment, the control section 19 performs predetermined control operation as described below. In particular, the control section 19 performs a predetermined countermeasure control described later when the oscillation of the optical device 140 has been stopped (when the control section 19 determines that the oscillation of the optical device 140 has been stopped) during the drive operation by the drive section described above. Specifically, the control section 19 determines, based on the magnitude of the detected voltage V1, whether the oscillation of the optical device 140 has been stopped, and then performs the countermeasure control. To be more specific, the control section 19 determines that the oscillation of the optical device 140 has been stopped when the value of the detected voltage V1 is smaller than the above-described voltage range ΔV (the minimum threshold voltage Vthmin) or larger than the voltage range ΔV (the maximum threshold voltage Vthmax).

(Detail of Control Operation by Control Section 19)

Figure 9:
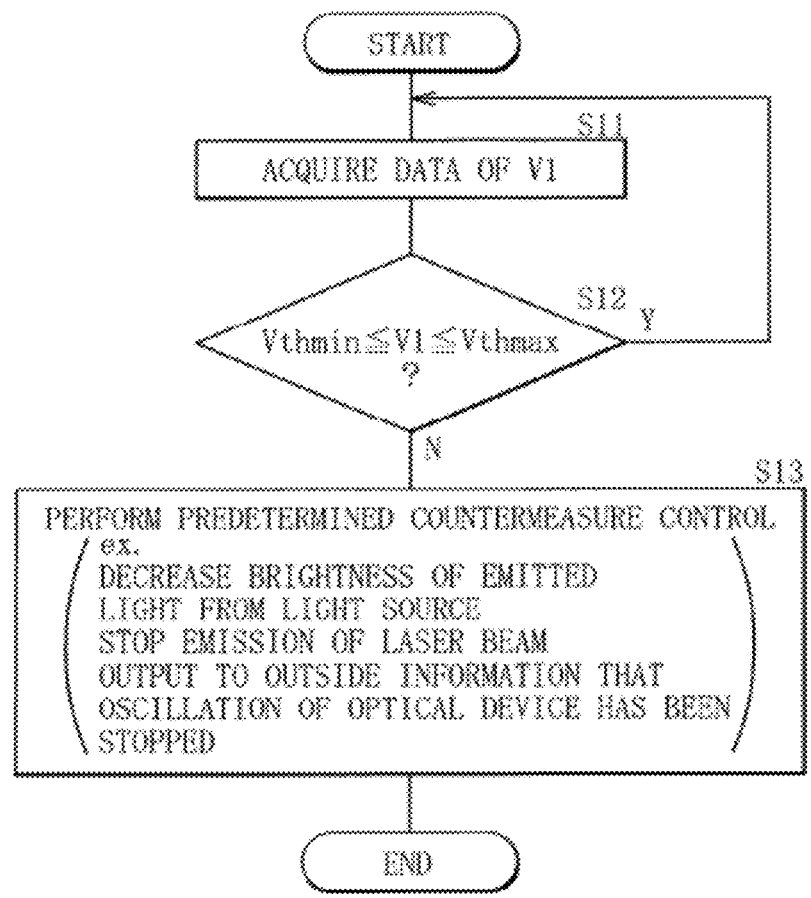
FIG. 9 is a flowchart illustrating an example of control operation by the control section.

FIG. 9 is a flowchart illustrating an example of the control operation by the control section 19. At the time of the control operation, as illustrated in FIG. 3, for example, the control section 19 first acquires data of the detected voltage V1 from the drive section (Step S11). Next, the control section 19 determines whether the value of the detected voltage V1 is within the voltage range ΔV, namely, whether the value of the detected voltage V1 is the minimum threshold voltage Vthmin or more and the maximum threshold voltage Vthmax or less (Vthmin≤V1≤Vthmax) (Step S12).

At this time, when it is determined that the value of the detected voltage V1 is within the voltage range ΔV (Vthmin≤V1≤Vthmax is satisfied) (Step S12: Y), the control section 19 determines that the oscillation of the optical device 140 is not stopped (is normally performed), and the procedure returns to the initial step S11. On the other hand, when it is determined that the value of the detected voltage V1 is not within the voltage range ΔV (Vthmin≤V1≤Vthmax is not satisfied) (Step S12: N), the control section 19 determines that the oscillation of the optical device 140 has been stopped (is not normally performed) by any factor, and then the control section 19 performs the following countermeasure control (Step S13). In addition, at this time, in the case where the value of the detected voltage V1 is smaller than the voltage range ΔV (V1<Vthmin), the control section 19 determines that the oscillation of the optical device 140 has been stopped due to the above-described first factor (occurrence of disconnection in the drive section). On the other hand, when the value of the detected voltage V1 is larger than the voltage range ΔV (Vthmax<V1), the control section 19 determines that the oscillation of the optical device 140 has been stopped due to the above-described second factor (presence of the foreign matter in the drive section).

The predetermined countermeasure control is one or both of control of decreasing brightness of emitted light (herein, laser beams) from the light source section (the red laser 11R, the green laser 11G, and the blue laser 11B) and control of outputting information (alerting) that the oscillation of the optical device 140 has been stopped to the outside (user). The control of decreasing the brightness of emitted light at this time is, as an example, control of stopping emission of the laser beams (the red laser beam, the green laser beam, and the blue laser beam) from the laser light sources (the red laser 11R, the green laser 11G, and the blue laser 11B), or control of suppressing light amount of the emitted laser beams. In other words, the control is to stop the emission operation of the laser light sources, or to prevent the emission operation. Moreover, the control of outputting information that the oscillation has been stopped to the outside includes, for example, lighting of a predetermined (alert) lamp, generation of predetermined sounds (warning alarm), or predetermined display (warning display) on a monitor or a screen. Incidentally, in addition to this, a predetermined screen for selection is displayed on the monitor or the screen to provide, to a user (allows a user to select), options including whether display of the state where the interference pattern is generated is continued, whether the above-described control of decreasing the brightness of emitted light is performed, and the like. By performing such countermeasure control, even if the oscillation of the optical device 140 has been stopped due to any factor (for example, the above-described first or second factor), the interference pattern generated due to the oscillation stop is allowed to be hardly viewed, or the information that the oscillation has been stopped is allowed to be provided to the user. In other words, the reduction of the interference pattern according to the operation state of the display apparatus 1 is allowed to be achieved. As described above, the control operation by the control section 19 illustrated in FIG. 9 is completed.

As described above, in the embodiment, when the oscillation of the optical device 140 has been stopped during the drive operation by the drive section, the control section 19 performs one or both of the control of decreasing the brightness of the emitted light from the red laser 11R, the green laser 11G, and the blue laser 11B and the control of outputting to the outside information that the oscillation of the optical device 140 has been stopped. Therefore, the reduction of the interference pattern according to the operation state of the display apparatus 1 is allowed to be achieved, the image quality deterioration is suppressed although the screen becomes slightly dark, and convenience for users is allowed to be improved as well.

Moreover, the countermeasure control is performed depending on the determination whether the oscillation of the optical device 140 has been stopped, based on the magnitude of the detected voltage V1. Therefore, it is possible to detect (specify) the factor of the oscillation stop (which factor of the first and second factors described above causes the oscillation stop), in addition to the occurrence of the oscillation stop of the optical device 140. Accordingly, the information (the factor of the oscillation stop) useful for recovering from the oscillation stop (breakdown) is allowed to be grasped, and thus convenience for users is allowed to be further improved.

[Modification]

Hereinbefore, although the technology has been described with referring to the embodiment, the technology is not limited to the embodiment, and various modifications may be made.

For example, in the above-described embodiment, although the case where the control section 19 is contained in the housing 10 has been described as an example, the technology is not limited to such a case, and the control section 19 may be disposed outside of the housing 10.

Moreover, in the above-described embodiment, the case where the optical device is allowed to oscillate in a predetermined direction in a plane orthogonal to the light path of the laser beam or along the light path has been described, however the technology is not limited to the case. In other words, the optical device may oscillate along other directions if oscillation (micro-oscillation) is needed.

Furthermore, in the above-described embodiment, the case where the plural kinds (for red, green, and blue) of light sources are all laser light sources has been described, however the technology is not limited to the case, and at least one of the plural kinds of the light sources may be a laser light source. In other words, the laser light source may be provided in combination with other light sources (for example, LED) in the light source section.

In addition, in the above-described embodiment, the case where the light modulation device is a reflection-type liquid crystal device has been described as an example, however the technology is not limited to the case. For example, the light modulation device may be a transmission-type liquid crystal device, and further, may be a light modulation device other than the liquid crystal device.

Moreover, in the above-described embodiment, the case where three kinds of light sources which emit light with different wavelengths has been described, however one kind, two kinds, or four or more kinds of light sources may be used instead of three kinds of light sources, for example.

Furthermore, in the above-described embodiment, the components (optics) of each of the optical unit, the illumination unit, and the display apparatus have been described specifically, however, all the components are not necessarily provided and other components may be further provided.

In addition, in the above-described embodiment, the case where the display apparatus is configured as a projection type display apparatus including projection optics (projection lens) projecting light modulated by the light modulation device onto a screen has been described. However, the technology is applicable to a direct-view-type display apparatus and the like.

The present application contains subject matter related to that disclosed in Japanese Priority Patent Application JP 2011-053988 filed in the Japan Patent Office on Mar. 11, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An illumination unit comprising:
   a light source section including a laser light source;
   an optical device configured to allow a laser beam from the laser light source to pass therethrough;
   a drive section configured to cause the optical device to oscillate during a drive operation; and
   a control section configured to (i) decrease brightness of emitted light from the light source section, and (ii) output information related to oscillation of the optical device upon determining that the oscillation of the optical device has stopped during the drive operation, the information indicative of either an occurrence of disconnection in the drive section or a presence of a foreign matter in the drive section.

2. The illumination unit according to claim 1, wherein,
   the drive section includes a resistive element configured to detect, as a voltage, a drive current flowing during oscillation of the optical device, and
   the control section is configured to determine whether the oscillation of the optical device has been stopped based on magnitude of the voltage detected by the resistive element.

3. The illumination unit according to claim 2, wherein the control section is configured to determine that the oscillation of the optical device has been stopped when the value of the detected voltage is smaller than a predetermined voltage range, or larger than the predetermined voltage range.

4. The illumination unit according to claim 3, wherein:
   the control section is configured to determine that the oscillation of the optical device has been stopped due to the occurrence of disconnection in the drive section if the value of the detected voltage is smaller than the voltage range, and
   the control section is configured to determine that the oscillation of the optical device has been stopped due to the presence of the foreign matter in the drive section if the value of the detected voltage is larger than the voltage range.

5. The illumination unit according to claim 1, wherein the control section is configured to decrease brightness of the emitting light by stopping emission of the laser beam from the laser light source.

6. The illumination according to claim 1, wherein the optical device is a prism array, a diffraction device, or a lens.

7. The illumination unit according to claim 1, wherein the light source section includes three light sources emitting red light, green light, and blue light, respectively.

8. The illumination unit according to claim 7, wherein at least one of the three light sources is the laser light source.

9. A display apparatus comprising:
   an illumination unit configured to emit illumination light; and
   a light modulation device configured to modulate the illumination light based on a picture signal,
   wherein,
   the illumination unit includes
   (a) a light source section including a laser light source;
   (b) an optical device configured to allow a laser beam from the laser light source to pass therethrough;
   (c) a drive section configured to cause the optical device to oscillate during a drive operation; and
   (d) a control section configured to (i) decrease brightness of emitted light from the light source section, and (ii) output information related to oscillation of the optical device upon determining that the oscillation of the optical device has stopped during the drive operation, the information indicative of either an occurrence of disconnection in the drive section or a presence of a foreign matter in the drive section.

10. The display apparatus according to claim 9, further comprising:
    projection optics configured to project illumination light which has been modulated by the light modulation device onto a surface to be projected.

11. The display apparatus according to claim 9, wherein the light modulation device is a liquid crystal device.

* * * * *